Jan. 4, 1938.   C. G. LEIGH   2,104,262
BASKET COVER
Filed Dec. 22, 1934   3 Sheets-Sheet 1
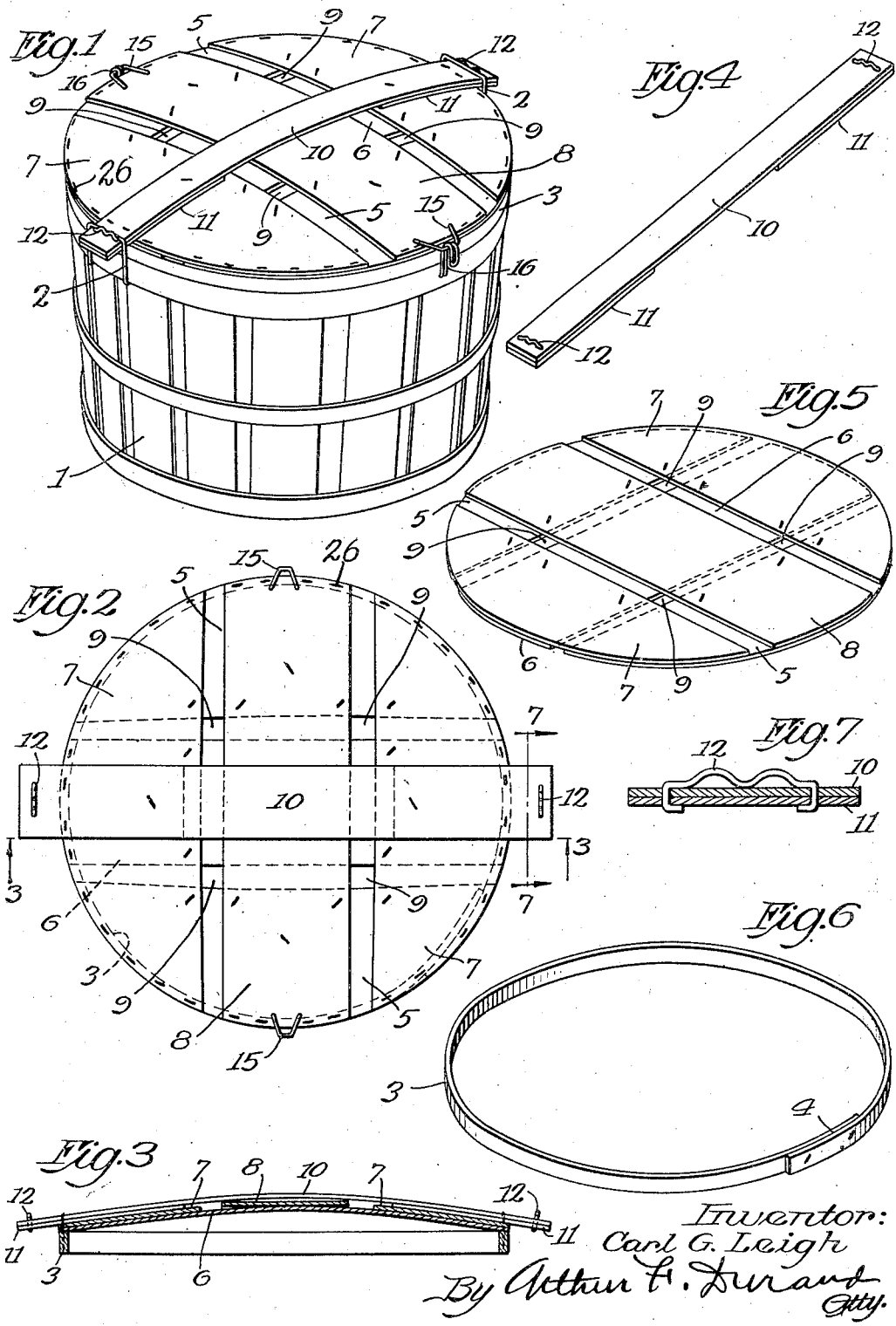
Inventor:
Carl G. Leigh
By Arthur F. Durand
Atty.

Jan. 4, 1938.  C. G. LEIGH  2,104,262
BASKET COVER
Filed Dec. 22, 1934  3 Sheets-Sheet 2
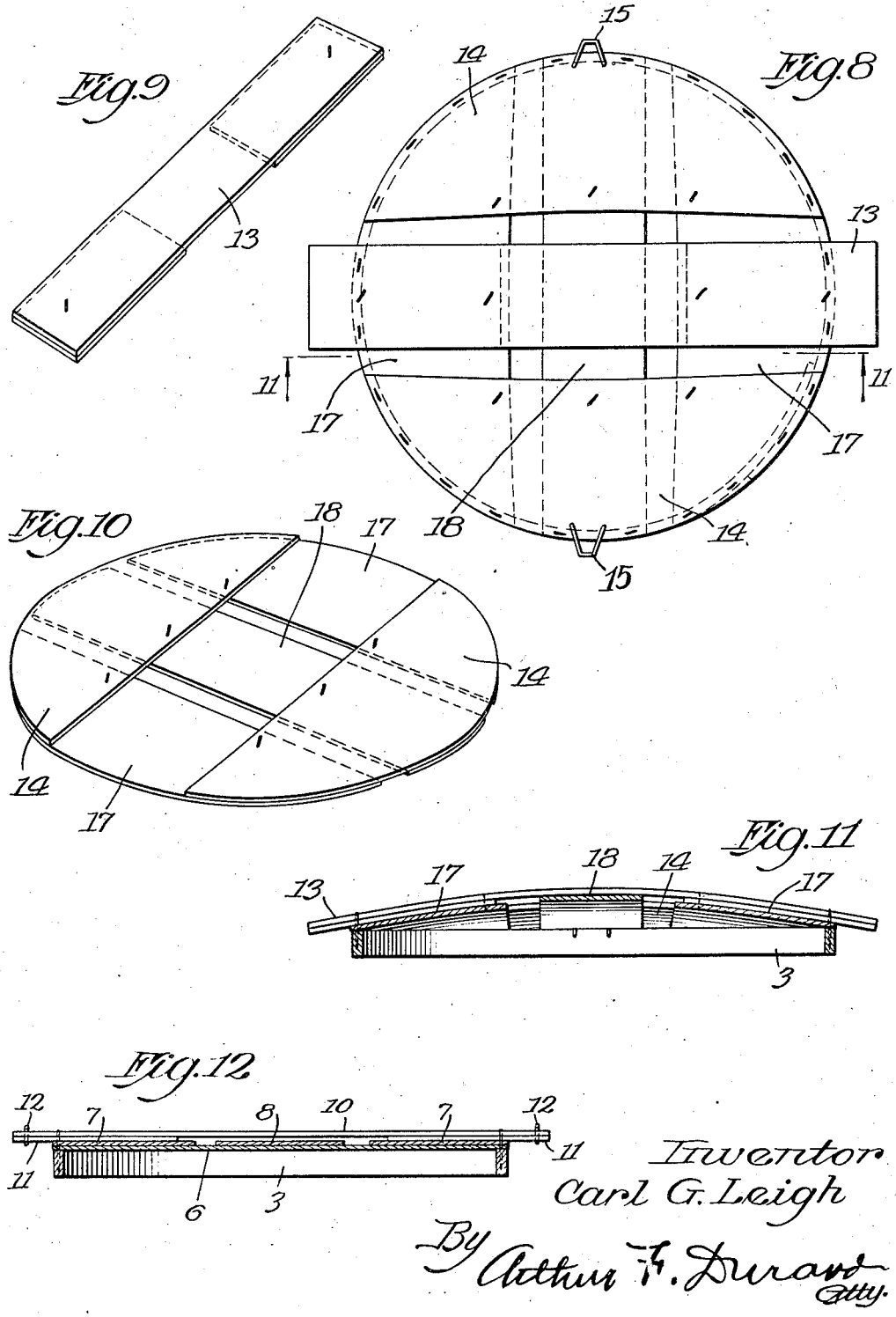

Jan. 4, 1938. C. G. LEIGH 2,104,262
BASKET COVER
Filed Dec. 22, 1934 3 Sheets-Sheet 3
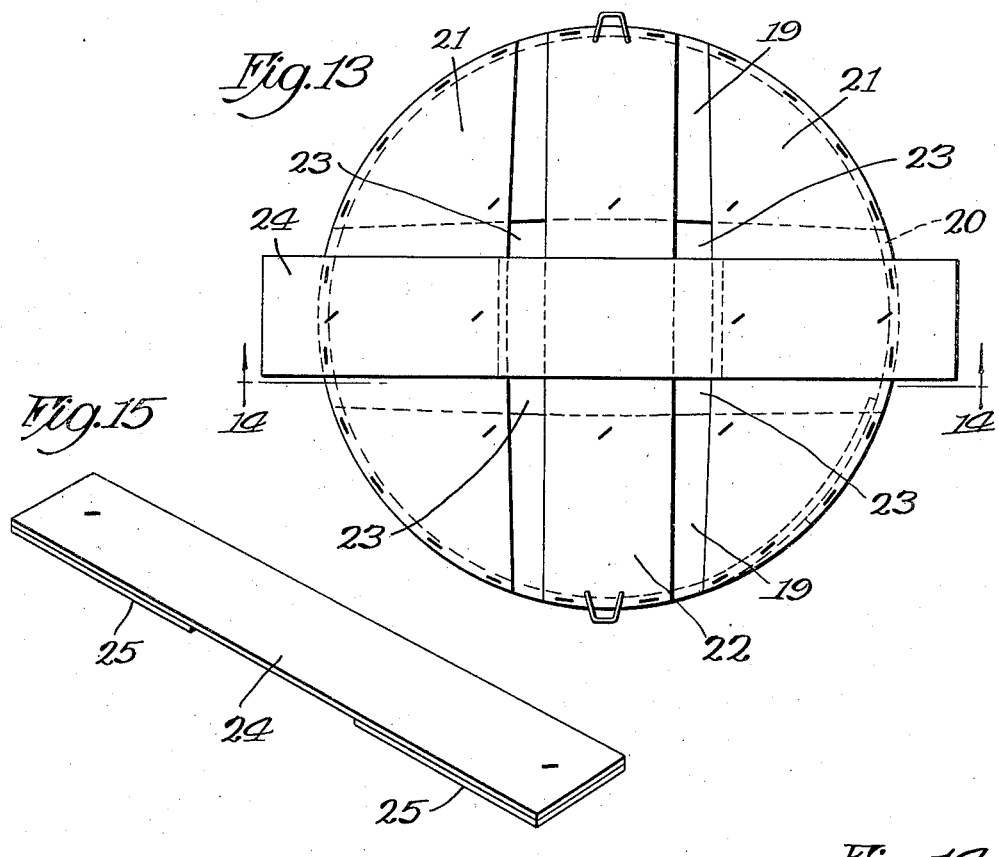
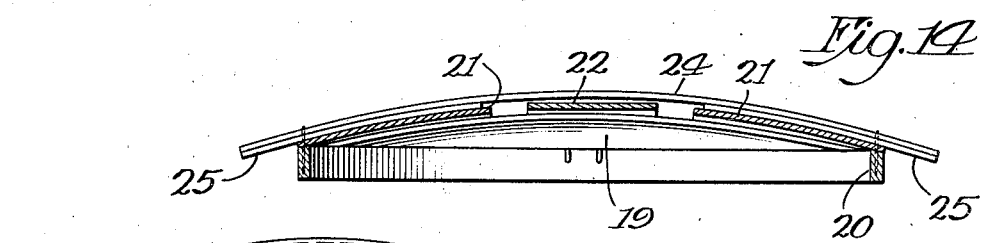
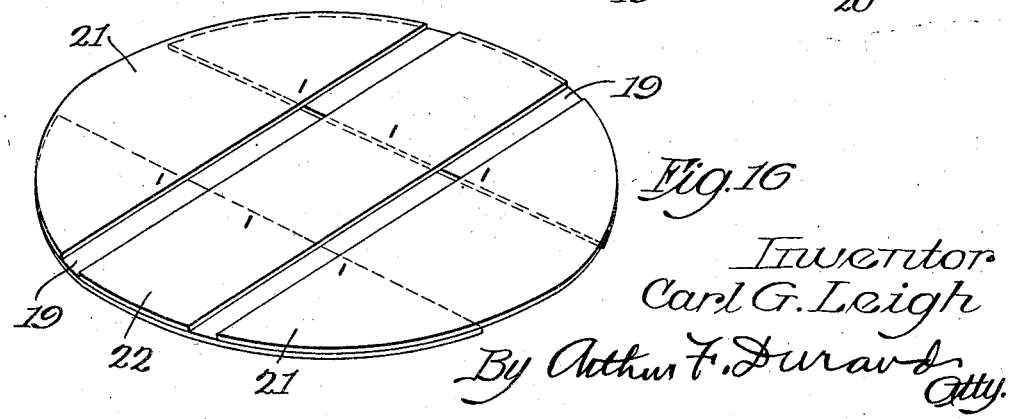
Inventor
Carl G. Leigh
By Arthur F. Durand
Atty.

Patented Jan. 4, 1938

2,104,262

UNITED STATES PATENT OFFICE 2,104,262

BASKET COVER

Carl G. Leigh, Chicago, Ill., assignor to Leigh Banana Case Company, Chicago, Ill., a corporation of Delaware Application December 22, 1934, Serial No. 758,799

19 Claims. (Cl. 217—124)

This invention relates to basket covers, and more particularly to those that are used on bushel baskets, or on half-bushel baskets, and baskets of similar character, and more especially to covers of this kind that are each provided with a so-called handle strip that projects through the handles of the basket, usually wire handles, after the basket is loaded, to removably hold the cover in place.

Generally stated, the object of the invention is to provide a novel and improved construction and arrangement whereby a basket cover of this character will be more satisfactory in use, in various ways, than heretofore.

A special object is to provide an improved construction and arrangement whereby a basket cover of this kind will be convex on its upper surface, and concave on its lower surface, in a manner tending to increase the strength thereof, while at the same time permitting the use of thinner material than was heretofore used for this purpose.

Another object is to provide a novel and improved construction whereby the handle strip is advantageously composed of both long and short sections, the relatively short sections being employed to reinforce the end portions of the relatively long section or sections, in a manner tending to reduce the stiffness of the handle strip at the middle portion thereof, thus permitting easier flexing of the strip at its middle, while at the same time insuring the requisite strength necessary for the end portions of the strip.

Another object is to provide an improved form of engaging means on the end portions of the handle strip, for more effectively engaging the handles of the basket, when the cover is fastened in place by engaging the handles with the end portions of the handle strip.

It is also an object to provide certain details and features of construction tending to increase the general efficiency and the desirability of a basket cover of this particular character.

To the foregoing and other useful ends, the invention consists in matters hereinafter set forth and claimed and shown in the accompanying drawings, in which—

Fig. 1 is a perspective of a basket, either a bushel basket or a half-bushel, provided with a cover embodying the principles of the invention.

Fig. 2 is a plan view of said cover.

Fig. 3 is a transverse section of said cover on line 3—3 in Fig. 2 of the drawings.

Fig. 4 is a perspective of the preformed or fabricated handle strip shown in Figs. 1 and 2 of the drawings.

Fig. 5 is a perspective of the preformed cover web employed in making the cover.

Fig. 6 is a perspective of the preformed hoop which is attached to the said web.

Fig. 7 is a transverse section of the handle strip on line 7—7 in Fig. 2 of the drawings.

Fig. 8 is a view similar to Fig. 2, showing a different form of the invention.

Fig. 9 is a perspective of the preformed or fabricated handle strip shown in Fig. 8 of the drawings.

Fig. 10 is a perspective of the preformed web employed in making the cover shown in Fig. 8 of the drawings.

Fig. 11 is a transverse vertical section on line 11—11 in Fig. 8 of the drawings.

Fig. 12 is a sectional view similar to Fig. 3 of the drawings, but showing a different form of the invention.

Fig. 13 is a plan view of a cover embodying the principles of the invention, showing a different form of the invention.

Fig. 14 is a transverse vertical section on line 14—14 in Fig. 13 of the drawings.

Fig. 15 is a perspective of the combined handle strip and web member shown in Fig. 13 of the drawings.

Fig. 16 is a perspective of the flat preformed web that is employed in making the cover shown in Fig. 13 of the drawings.

As thus illustrated, the invention comprises the basket body 1 of any suitable character, either a bushel or half-bushel, provided at opposite sides with wire handles 2 of the well known form.

As shown in Figs. 1 to 7 inclusive, the cover for the basket comprises a hoop 3, preferably a preformed hoop with a staple joint at 4, having the web shown in Fig. 5 stapled or otherwise secured to the upper edge thereof. This web comprises the two outside under strips 5, spaced apart and provided with curved outer edges conforming to the curvature of the hoop, and the straight strip 6 in the space between the strips 5, so that spaces are left between their opposing edges. The grain of the wood or veneer from which these strips are formed extends lengthwise thereof. To said three strips, are secured the three similar upper strips 7 and 7 and 8, crosswise thereof, in the manner shown, whereby the cover has four rectangular openings 9, as shown. Preferably, the six strips, with their edges curved to conform to the curvature of the outer side of the hoop, are stapled together while they are held in their proper relative positions.

The preformed or fabricated handle strip, shown in the drawings, comprises an upper section 10 and two lower shorter sections 11, the upper section being full length, and the two lower sections being each somewhat less than half the full length. Of course, two or more full length sections could be used, and also it is obvious that four or more lower shorter sections could be used, if desired. However, by using relatively short reinforcing end sections, the middle of the handle strip is more flexible, is not so stiff, and has less tendency to assume its straight position, when curved in the manner shown in Fig. 1 of the drawings. To hold the sections of the handle strip together, staples may be inserted, of any suitable character, but as a matter of further and special improvement, the wide staples 12 are preferably employed for this purpose, as shown in Fig. 7 of the drawings, so that they will provide effective engaging means for engaging the wire handles 2, when the latter are first bent outwardly and then back again over the ends of the handle strip, in the manner shown.

Preferably, the handle strip, which is still straight, is fastened to the web shown in Fig. 5, which latter is also still flat, before attaching the web to the upper edge of the hoop 3, shown in Fig. 6 of the drawings. Or, the web may be attached to the hoop, and the handle strip may thereafter be secured in place, if such is desired. In any event, the fastening of the web to the hoop is done in a manner to crown the web, causing it to become of less diameter and convex on its upper surface and concave on its lower surface, before staples are inserted to secure the edges of the web to the upper edge of the hoop. This means, of course, that the web shown in Fig. 5 is of greater diameter than the hoop 3, in order to insure that the two things will have the same diameter, substantially, when they are fastened together.

In this way, a strong and stiff cover is provided, and it can be made of thinner material than heretofore employed for this purpose, as it is found that veneer of one-tenth of an inch, or even one-twelfth of an inch in thickness, is sufficient for this purpose, whereas formerly, for ordinary flat covers, veneer of one-eighth of an inch was considered necessary. By using the construction shown and described, there is less tendency on the part of the bent or curved materials to spring back into their flat condition, and this is not only true of the multi-ply web that is attached to the hoop, but is epecially true of the multi-ply handle strip shown and described, as by using the thinner material, it has relatively less stiffness at the middle, while having the requisite stiffness in its end portions.

In Figs. 8, 9, 10, and 11, the construction is similar to that previously described, but in this case the handle strip 13 is employed to take the place of the upper middle strip 8, previously described, so that in this case the handle strip is parallel with the two outer sections 14, which latter are similar to the sections 7 and 7, previously described. This handle strip 13 may, or may not, have the staples 12, and this handle strip is preferably fabricated with the flat web, and forms not only the handle strip pure and simple, but also one of the strips or sections of the web itself.

As shown in Fig. 12 of the drawings, the cover is entirely flat, but it nevertheless has the two-ply web construction, exactly the same as the one shown in Fig. 5 of the drawings, and it also has the two-ply and preformed or fabricated handle strip shown in Fig. 4 of the drawings.

It will be seen, therefore, that in each form of the invention, there is a web having two-ply outer edge portions curved to conform to the curvature of the hoop, with these two-ply portions stapled or otherwise fastened to the hoop, and it is also true that in combination with this two-ply web construction, there is, in each form of the invention, a multi-ply handle strip comprising relatively short and long sections suitably fastened together, so that the preformed or fabricated handle strip can be fastened to the web either before or after the latter is fastened to the basket hoop.

Also, in the form of the invention shown in Fig. 1, and in the form of the invention shown in Fig. 8, the two-ply web construction involves the use of a preliminary flat preformed or fabricated web, of greater diameter than the hoop, whereby it is essential to have multi-ply curved edges, preferably two-ply, of greater diameter when the web is still flat, than the diameter of the hoop, for when the preformed or fabricated web thus formed is attached to the hoop, it must be of sufficient diameter to allow for the bending or crowning effect that is necessary in order to have the cover convex above and concave below. The contraction of the two-ply edges, or multi-ply edges, in this manner, to bring the said multi-ply edges flush with the outer side of the hoop, is essential to the form of the invention shown in Fig. 1, and to the form of the invention shown in Fig. 8 of the drawings. In addition, it is also essential, in the forms of the invention shown in Figs. 1 and 8 of the drawings, that the handle strip be of sufficient length to allow for the contraction or shortening action, in effect, that it undergoes when the web is crowned before stapling or otherwise attaching it to the upper edge of the hoop.

In addition to the fastening of the cover in place by projecting the ends of the handle strip through the handles, it will be observed that wire fasteners may also be used, at points intermediate between the ends of the handle strip, if desired. For example, wire loops 15 may be attached to the cover, and similar, but narrower, loops 16 may be attached to the basket body, the loops being adapted to be inserted upwardly through the loops 15 and then bent downwardly to hold the cover in place, as shown in Fig. 1 of the drawings.

Of course, in the handle strip, such as the one shown in Fig. 4 or in Fig. 9 of the drawings, the grain of the wood must extend lengthwise thereof, so that this grain will be at right angles to the grain of the strips 7 and 7 and 8, or the grain of the strips 17 and 17 and 18, depending upon whether the cover is the kind shown in Fig. 1 of the drawings, or the kind shown in Fig. 8 of the drawings, for in either case there is a handle strip secured to a two-ply cover web, with the grain of the wood in the handle strip extending at right angles to the grain of the wood of the veneer ply to which the handle strip is directly secured.

In each form of the invention, it will be seen, strips of veneer are fastened together, to form the different plies of the web, and while the strips in each ply are shown separated, to provide ventilating openings, it is nevertheless true that, in effect, the web has continuous or unbroken circular edges, and while these edges are of a single thickness at certain points, they are nevertheless practically continuous and without any break in the circular continuity thereof. Also, as shown in Fig. 1 of the drawings, and as shown in Figs. 8, 9, 10, and 11 of the drawings, the multi-ply and stapled web is of greater diameter when flat, when stapled together in a flat condition, than it is when bulged upwardly and secured to the hoop.

As shown in Figs. 13 to 16, inclusive, the construction is similar to that shown in Fig. 8 of the drawings, but with certain changes as follows: In the first place, the lower layer or ply of the cover comprises only the two arcuate sections 19 and 19, spaced apart as shown, and fastened at their curved edges to the hoop 20, which latter is similar to the hoop previously described. The upper layer of the web comprises the two arcuate sections of veneer or other suitable material 21 and 21, being the outside strips of this upper layer, and the middle strip or section 22 disposed between the inner edges of the two sections 21 and 21, as shown in Fig. 13 of the drawings. The outer curved edges of the sections 21 and 21 are stapled to the said hoop, and the end edges of the intermediate strip or section 22 is similarly fastened to the hoop, so that four openings 23 are formed in the cover for ventilation. The handle strip comprises the upper section 24, the two lower sections 25, stapled or otherwise fastened together, and then fastened in place upon the upper surfaces of the sections 21 and 21 and 22, by staples or other fasteners inserted downwardly through the two layers of the handle strip and through the single layer of veneer formed by the sections 21 and 21 below the handle strip. As was the case previously, the web shown in Fig. 16 is made flat, and the handle strip is preferably attached thereto, and the web with its attached handle strip is then preferably bent down at its outer edges and fastened to the hoop, thereby crowning or bulging the basket cover upwardly, so that it is convex on its upper surface, and concave on its lower surface.

Therefore, in each form of the invention shown in Figs. 2 and 13, the handle strip extends over the curved edges of two upper arcuate sections of the web. As the grain of the veneer in these arcuate sections extends parallel with their straight inner edges, it follows that the curved outer edges, those portions directly under the handle strip, could be more easily split or broken off, but the handle strip protects these edges and guards against injury or trouble of that kind. Also, regarding the curved edges of the lower arcuate sections of the web, it will be seen that these edges are protected by the end portions of the upper middle section of the web, as in the latter the grain extends lengthwise thereof, and hence all four of the portions of the curved edges of the arcuate sections, those portions where the grain runs out at the edge at points a comparatively short distance apart, are protected by the layer or ply immediately above. Again, as shown in Fig. 8 of the drawings, the middle portion of the arcuate edge of each of the sections 17 and 17 is protected by the handle strip 13, while the middle portions of the curved edges of the arcuate sections 14 and 14 are protected, more or less, by the end portions of the middle understrip 18, and by the fastener loops 15.

In addition, with the element 12 of the length shown and described, so that it terminates at each end a distance from the adjacent side edge of the handle strip, it is found that it is much easier to get the handle over this catch device, as it may be called, in fastening the cover in place. Also, with the device 12 thus made of less length than the width of the handle strip, it is easier to disengage the handles when it is desired to remove the cover from the basket.

Looking at Fig. 1 of the drawings, for example, it will be seen that the handle strip 10 and 11 could be left off, and that two or more wire fasteners, such as the fasteners 15 and 16, could be used in place of the handle strip and the wire handles 2 of the basket, as this would provide four equidistant points at which the cover is fastened in place, and a satisfactory cover for certain purposes.

Practically, with the construction shown and described, the mat of superposed plies of veneer, or other suitable material, employed for the cover, in each form of the invention, is in effect a sheet of plywood, as the plies are fastened permanently and tightly together, and in this way a practically smooth and unbroken circular edge is provided which can be made flush with the periphery of the preformed hoop. In this way, the staples 26, employed for stapling the mat to the preformed hoop, can be driven close to the circular edge of the mat, to secure the latter to the hoop, inasmuch as each and every staple will have its top or head disposed crosswise of at least some grain of the wood veneer from which the mat may be made, and breakage along the circular edge of the mat, and pulling out of the staples, is not liable to occur. In this way, the basket has a strong top cover which is fully adequate for the support of another loaded basket thereon, or even several baskets, stacked in the manner in which they are arranged in warehouses or trucks or cars for shipment. The contents of the basket is well protected, as the cover, in each form of the invention, when called upon to support the weight of one or more baskets above, is not liable to crush the fruit or other produce in the basket, for the mat has a practically continuous or unbroken edge that may be practically continuously and effectively stapled to the upper edge of the preformed hoop, whereby the latter and the mat become a strong structural unit that is effective for preventing injury to the contents of the basket.

It will be understood, of course, that the covers shown in Figs. 8, 12 and 13 are for use on the basket body 1, shown in Fig. 1 of the drawings, so that the cover fastener members 15 of Figs. 8, 12, and 13 will engage the basket body fastener members 16, as shown and described, it being understood that the same basket body 1 of Fig. 1 is for use with any and all of the covers shown and described.

With the construction shown and described, it will be seen that the annular edge of the mat shown in Fig. 5, or of the mat shown in Fig. 10, or of the mat shown in Fig. 16, is practically continuous and unbroken, and provides a multi-ply edge that is not easily broken at any point therein. Not only is the edge continuous and unbroken, but it is also true that rectangular ventilating openings, such as the openings 9, or the openings 23, or the more elongated openings shown in Figs. 10 and 16, are provided, at points equidistant from the outer edge of the cover.

In each form of the invention, it will be seen, there are a plurality of veneer plies or thicknesses, of one kind or another, between the hoop 3 and the handle strip, and in each case the latter is secured to the hoop by staples extending through this strip and one or more plies into the upper edge of the hoop.

With the construction shown and described, therefore, the disc forming the top wall of the cover has an apertured middle portion, with all of the apertures thereof remote from the hoop, and also has an imperforate area entirely around inside the hoop, and at all the points over the edge of the hoop as well. With this imperforate area, extending a distance inside the hoop, there is less danger of jabbing and injuring the fruit or other contents of the basket. With an ordinary cover, having openings adjacent the hoop, the fruit or other commodity is exposed to injury, by the hands of workers who carry the loaded baskets, or in other ways.

What I claim as my invention is:

1. In a basket top cover, a handle strip therefor adapted to engage the handles of the basket, said strip comprising superposed flat relatively long and short sections, fastened together, with the short sections extending a distance over the web of said cover and spaced apart at their inner ends at the middle of the cover, providing a relatively flexible middle portion for the handle strip, and relatively stiff multi-ply projecting end portions therefor, overlying and engaging and fastened to the top of the cover, under the handles.

2. A structure as specified in claim 1, said short sections being secured to the mat underneath the long sections.

3. In a basket top cover, the combination of a pre-formed hoop of a size to rest on the top edge of the basket, a pre-formed or fabricated veneer web of multi-ply construction, having the superposed plies formed by upper and lower strips spaced apart at their edges and arranged with the strips of one ply extending at right angles to the strips of another ply, with the grain of the wood extending lengthwise of each strip, providing a continuous or unbroken multi-ply circular reinforced edge practically flush with the periphery of the hoop and secured to the upper edge of the hoop, by fasteners inserted downwardly through the web close to said edge thereof and into said hoop, whereby said fasteners have the double structural function of maintaining the continuity of said circular edge and of preventing separation of the hoop from the web, and a handle strip secured to the top of the cover and provided with projecting end portions to extend under the basket handles, the strips being spaced to provide a plurality of rectangular ventilating openings formed between the edges of strips, with said openings all spaced equidistant from said hoop, and the cover thus formed being removable as a unit from the top of the basket, said web being bulged upwardly, and said handle strip comprising relatively long and short superposed sections, fastened together, with the short sections extending a distance over the web of said cover and spaced apart at their inner ends at the middle of the cover, providing a relatively flexible middle portion for the handle strip, and relatively stiff multi-ply end portions therefor, overlying and fastened to the web by fasteners inserted through the plies into the web to engage said handles, the shorter sections being underneath the handle strip, and in direct engagement with the top of the web, whereby said web with continuous multi-ply circular edges is of greater diameter when flat than when fastened to said hoop, and said handle strip is in effect of greater length when flat than when fastened to the hoop.

4. In a basket top cover, the combination of a pre-formed hoop of a size to rest on the top edge of the basket, a pre-formed or fabricated veneer web of multi-ply construction, having the superposed plies formed by upper and lower strips spaced apart at their edges and arranged with the strips of one ply extending at right angles to the strips of another ply, with the grain of the wood extending lengthwise of each strip, providing a continuous or unbroken multi-ply circular reinforced edge practically flush with the periphery of the hoop and secured to the upper edge of the hoop, by fasteners inserted downwardly through the web close to said edge thereof and into said hoop, whereby said fasteners have the double structural function of maintaining the continuity of said circular edge and of preventing separation of the hoop from the web, and a handle strip secured to the top of the cover and provided with projecting end portions to extend under the basket handles, the strips being spaced to provide a plurality of rectangular ventilating openings formed between the edges of strips, with said openings all spaced equidistant from said hoop, and the cover thus formed being removable as a unit from the top of the basket, said handle strip comprising relatively long and short sections, fastened together, with the short sections extending a distance over the web of said cover and spaced apart at their inner ends at the middle of the cover, providing a relatively flexible middle portion for the handle strip, and providing relatively stiff multi-ply end portions therefor, overlying and fastened to the web by fasteners inserted through the plies into the web, to engage said handles.

5. In a basket top cover, the combination of a pre-formed hoop of a size to rest on the top edge of the basket, a pre-formed or fabricated veneer web of multi-ply construction, having the superposed plies formed by upper and lower strips spaced apart at their edges and arranged with the strips of one ply extending at right angles to the strips of another ply, with the grain of the wood extending lengthwise of each strip, providing a continuous or unbroken multi-ply circular reinforced edge practically flush with the periphery of the hoop and secured to the upper edge of the hoop, by fasteners inserted downwardly through the web close to said edge thereof and into said hoop, whereby said fasteners have the double structural function of maintaining the continuity of said circular edge and of preventing separation of the hoop from the web, and a handle strip secured to the top of the cover and provided with projecting end portions to extend under the basket handles, the strips being spaced to provide a plurality of rectangular ventilating openings formed between the edges of strips, with said openings all spaced equidistant from said hoop, and the cover thus formed being removable as a unit from the top of the basket, said handle strip comprising relatively long and short superposed sections all overlying and fastened to said web, with the short sections underneath the long sections, and all flush at the opposite ends of the handle strip.

6. In a basket cover, a cover hoop of a size to rest on the top edge of the basket, a web in the form of a disc having a continuous or unbroken annular periphery, formed of upper and lower wood veneer plies, with the grain in the upper ply extending crosswise of the grain in the lower ply, formed by upper and lower arcuate strips of the same size and form and one or more straight strips, providing an apertured middle portion and an imperforate marginal portion inside said hoop, all fastened together along the continuous or unbroken circular edge of the web, by staples extending through the web into the top edge of said hoop, whereby said staples have the double structural function of maintaining the continuity of said circular edge and of preventing separation of the web from the hoop, the cover having diametrically opposite ends projecting over said continuous edge and under the handles of the basket.

7. A structure as specified in claim 6, there being a plurality of plies between the hoop and the under side of said projecting ends.

8. A structure as specified in claim 6, said web being convex on its upper side, and concave on its lower side, forming a bulge cover.

9. A structure as specified in claim 6, the lower arcuate strips constituting the entire lower ply of the web.

10. A structure as specified in claim 6, there being a single upper straight strip having its middle disposed at right angles to the middle of a single lower straight strip.

11. A structure as specified in claim 6, there being two lower and two upper arcuate strips, with a single straight strip between them, spaced apart at their edges to form four rectangular ventilating openings disposed equi-distant apart and from said hoop.

12. A basket cover having a handle strip with projecting ends at opposite side edges of the cover, and a rigid wire staple having the legs thereof fully inserted through each end portion, and clinched on the under side thereof, with the rigid transverse head of each staple tightly engaging and resting transversely upon the upper side of the strip adjacent the end edge thereof, forming rigid retaining means for engaging the basket handles.

13. A structure as specified in claim 12, each said staple head having one or more elevated humps formed therein.

14. A structure as specified in claim 12, having a strip under each end portion of the handle strip, extending over the cover, fastened to the latter by said staples.

15. A basket cover comprising a pre-formed hoop, a web stapled to the upper edge of said hoop, and a plurality of superposed plies or thicknesses forming a handle strip with multi-ply projecting end portions, stapled entirely upon the top of said web, so that the entire handle strip is outside the cover.

16. A structure as specified in claim 15, said web being multi-ply in thickness, and having a continuous or unbroken annular edge interposed between the upper edge of said hoop and the under side of said superposed plies.

17. A structure as specified in claim 15, said web and its said handle strip being maintained convex on its upper surface and concave on its lower surface, by the stapling thereof to said hoop.

18. A structure as specified in claim 15, said web and its said handle strip being held flat by the stapling thereof to said hoop.

19. A structure as specified in claim 15, said handle strip being structurally characterized by the stapling of the plies thereof together before the strip is secured to the web.

CARL G. LEIGH.